United States Patent
Dowd

(10) Patent No.: US 9,614,384 B2
(45) Date of Patent: Apr. 4, 2017

(54) STYLUS CHARGING CASE

(71) Applicant: ADOBE SYSTEMS INCORPORATED, San Jose, CA (US)

(72) Inventor: Geoffrey Charles Dowd, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 424 days.

(21) Appl. No.: 14/463,181

(22) Filed: Aug. 19, 2014

(65) Prior Publication Data

US 2016/0056648 A1    Feb. 25, 2016

(51) Int. Cl.
  *H02J 7/00*    (2006.01)

(52) U.S. Cl.
  CPC .......... *H02J 7/0042* (2013.01); *H02J 7/0047* (2013.01)

(58) Field of Classification Search
  CPC ......... H01F 38/14; H02J 7/025; H02J 7/0042; H02J 17/00; H02J 5/005; H02J 7/0013; H02J 7/0052; H02J 7/0047; H02J 7/0044; H02J 50/12; H02J 50/50; H02J 50/80; H02J 7/0027; A61N 1/00; A61N 1/0553
  USPC .................................................. 320/106–115
  See application file for complete search history.

(56) References Cited

U.S. PATENT DOCUMENTS

| | | | |
|---|---|---|---|
| 2010/0021022 A1 | 1/2010 | Pittel et al. | |
| 2012/0235636 A1* | 9/2012 | Partovi | H02J 7/025 320/108 |
| 2014/0266026 A1* | 9/2014 | Dowd | H02J 7/025 320/108 |
| 2015/0138166 A1 | 5/2015 | Lee | |

FOREIGN PATENT DOCUMENTS

| | | |
|---|---|---|
| CN | 203788030 U | 8/2014 |
| WO | 2010078338 A1 | 7/2010 |

OTHER PUBLICATIONS

United Kingdom Examination and Search Report dated Nov. 17, 2015 in Application No. GB1512978.6, 6 pages.

* cited by examiner

*Primary Examiner* — Binh Tat
(74) *Attorney, Agent, or Firm* — Shook, Hardy & Bacon, L.L.P.

(57) ABSTRACT

Embodiments of the present invention relate to a portable charging case that can serve as both a charging base and a protective carrying case for a rechargeable stylus. The portable charging case can enable a quick connect and release of the stylus using magnetic force for magnetic engagement of the stylus to the charging base. The charging base may include a logic board that dynamically changes the polarity of the charge coming in through the charging base charging contacts. Such a dynamic change of polarity can recharge the stylus irrespective of the polarity alignment between the stylus charging terminals and the charging base charging contacts.

19 Claims, 5 Drawing Sheets

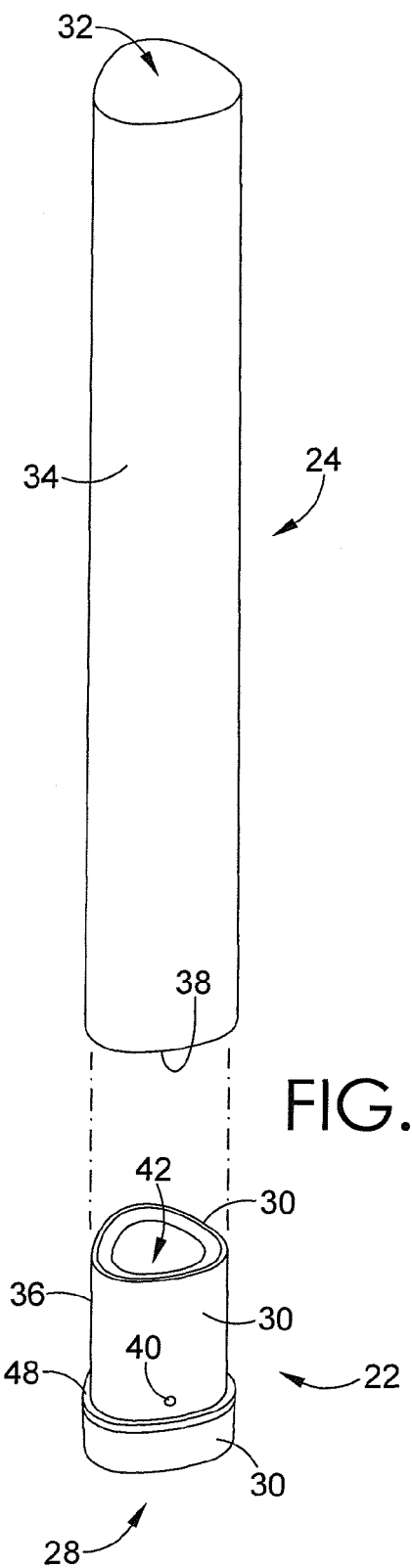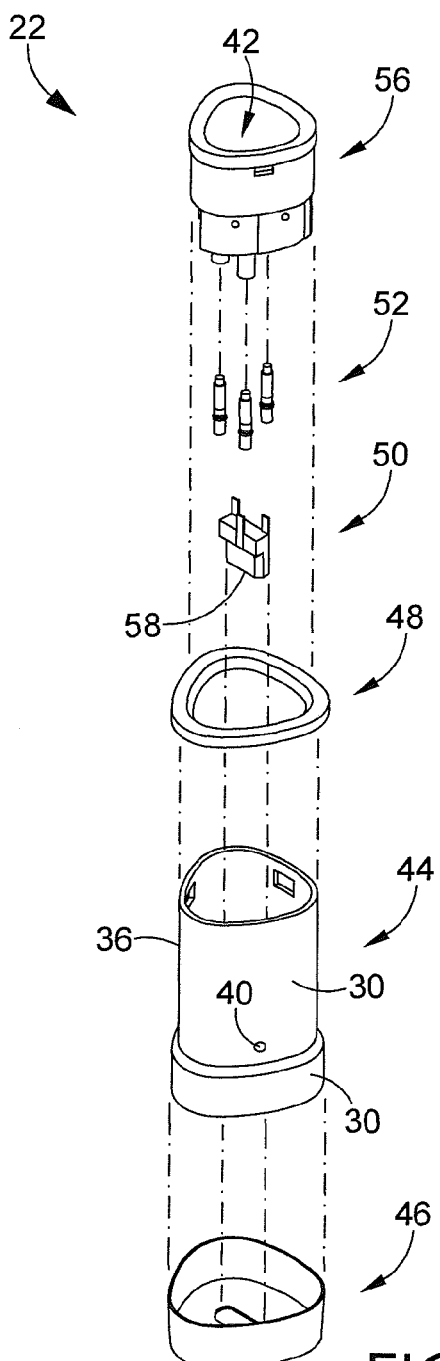
FIG. 3
FIG. 4

STYLUS CHARGING CASE

BACKGROUND

Advances in touchscreen technologies have led to an influx of products in the creative marketplace including products, like the stylus, for emulating writing or drawing with a pen-like object on the touchscreen instead of using one's finger. Products like ADOBE INK have been developed to provide users with a tool for producing electronic writings or drawings on a touchscreen, while also including secondary functionalities (e.g., wireless communication, storage, additional user inputs, enabling/disabling features, visual or haptic feedback, etc.). For supporting such functionalities, while maintaining the ergonomics and transportability of a pen-like object, a multi-purposed "smart" stylus may require a rechargeable power source.

SUMMARY

Embodiments of the present invention relate to a portable charging case that can serve as both a charging base and a protective carrying case for a rechargeable stylus. The portable charging case can enable a quick connect and release of the stylus using magnetic force for magnetic engagement of the stylus to the charging base. The charging base may include a logic board that dynamically changes the polarity of the charge coming in through the charging base charging contacts. Such a dynamic change of polarity can recharge the stylus irrespective of the polarity alignment between the stylus charging terminals and the charging base charging contacts. In some implementations, the charging base, while engaged with the stylus, can recharge the stylus while the stylus is in use.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 3 is a side perspective view of the charging case of FIGS. 1A and 1B, particularly illustrating the cap assembly and the base assembly in a disengaged relationship;

FIG. 4 is an exploded side perspective view of the base assembly of FIG. 3, particularly illustrating the bottom shell, overmold, LED diffuser, circuitry, charging contacts, and inner shell;

DETAILED DESCRIPTION

Figure 1A:
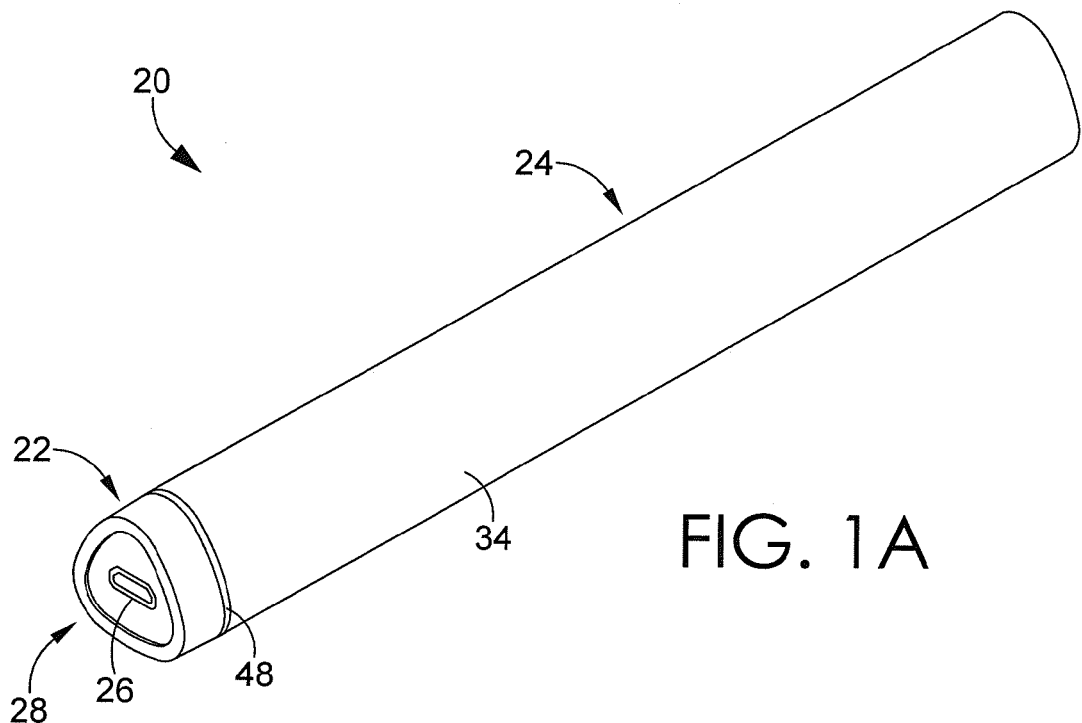
FIG. 1A is a rear perspective view of a charging case constructed in accordance with a preferred embodiment of the present invention, wherein the charging case is illustrated in an assembled state with a base assembly in an engaged relationship with a cap assembly.

The present invention is susceptible of embodiments in many different forms. While the drawings illustrate, and the specification describes, certain preferred embodiments of the invention, it is to be understood that such disclosure is by way of example only. There is no intent to limit the principles of the present invention to the particular disclosed embodiments.

Many styluses include a rechargeable power source (e.g., lithium ion battery, nickel cadmium battery, nickel metal hydride battery, lithium ion polymer battery, and other rechargeable batteries) so that the styluses can perform increased functionality, such as wireless communication, storage, additional user inputs, enabling/disabling features, visual or haptic feedback, etc. Although the battery life of a stylus may be lengthy, a user may be unable to utilize at least some functionality of the stylus if the battery becomes drained or discharged and the user does not have access to a charging unit to recharge the battery within stylus.

As such, embodiments of the present invention relate to a portable charging case that can serve as both a charging base and a protective carrying case for a rechargeable stylus. In this regard, the charging base can be integrated with a protective carrying case such that a user transporting a stylus within a carrying case will also have access to a charging unit to recharge the stylus when needed. The portable charging case can enable a quick connect and release of the stylus using magnetic force for magnetic engagement of the stylus to the charging base.

In general, aspects herein are directed toward a charging case for a stylus, such as ADOBE INK, the stylus having a first end and a second end, the first end presenting a charging block and the second end presenting a writing tip. The first and second ends define a theoretical axis that extends through the center of the writing tip and through the center of the charging block. The charging block is disposed at the first end presenting ferromagnetic charging terminals coupled to a rechargeable power source, such as a rechargeable battery. In one aspect, the case can include a charger body portion (also referred to herein as a "base assembly") having a magnetic element operable to magnetically secure the charger body portion relative to the charging block of the stylus. In another aspect, the charger body can include a logic board to dynamically change the polarity configuration of charging contacts to respective charging terminals so that the stylus can be received and charged in any configuration. In certain aspects, the case can include a cap portion (also referred to herein as a "cap assembly") having certain components to provide additional support and protection to the stylus. In some aspects, the theoretical axis extending through the stylus also extends through the charger body portion and cap portion when the stylus is secured to the charger body portion and the cap portion is similarly secured thereto.

Figure 1B:
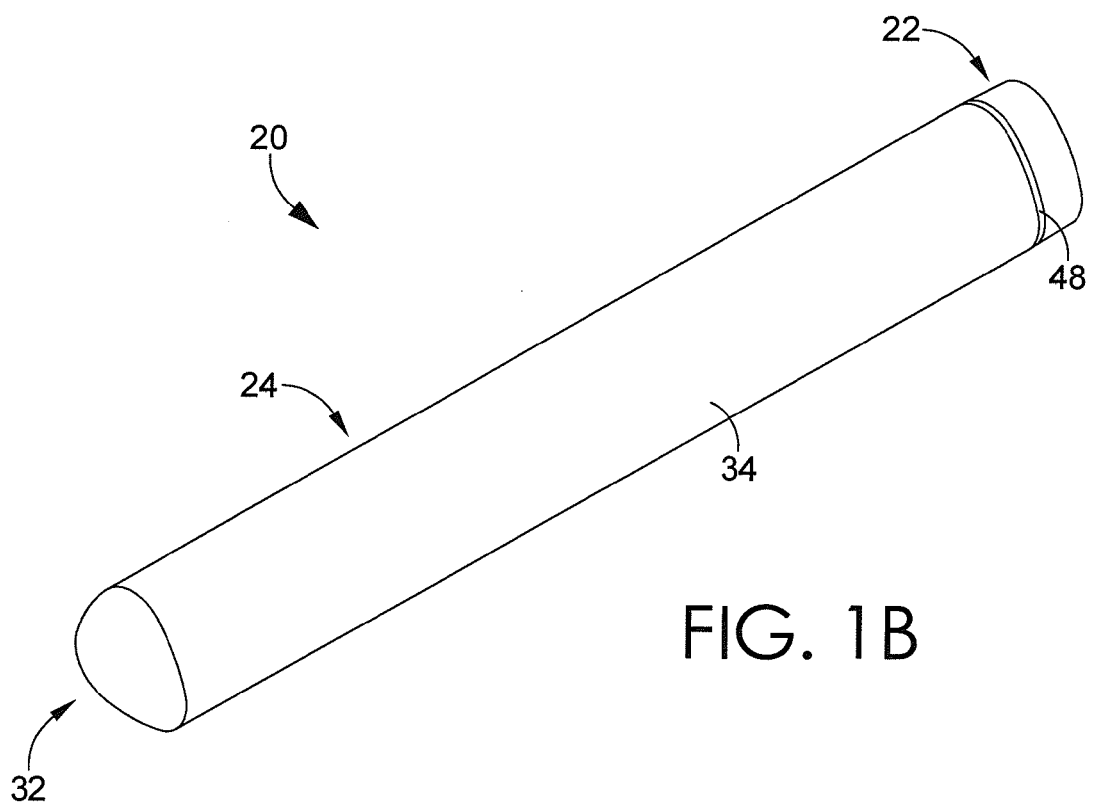
FIG. 1B is a front perspective view of the charging case of FIG. 1A.

Turning now to the figures to illustrate embodiments of the present invention, FIGS. 1A and 1B depict a portable charging case in accordance with various aspects hereof. The charging case 20 has a general configuration suitable for carrying a stylus, storing a stylus, and the like. The term "case" may be used herein for simplicity, in reference to various aspects of the portable charging case. The illustrated case comprises a base assembly 22 removably coupled to a cap assembly 24. The base assembly 22 and the cap assembly 24 may be configured to slidably engage one another as will be readily understood by one of ordinary skill in the art. As illustrated, the base assembly 22 is in a supporting relationship with the cap assembly 24. The base assembly presents a charging interface 26 (also referred to herein as a "communications bus") for providing electrical power signals into the base assembly, thereby charging an encased stylus or stylus connected to the base assembly, as will be described in further detail herein. In the illustrated embodiment, a micro-USB port is presented for the charging interface 26, although other interfaces may be considered (e.g., USB ports, Firewire ports, DC ports, and other proprietary interfaces).

Figure 2A:
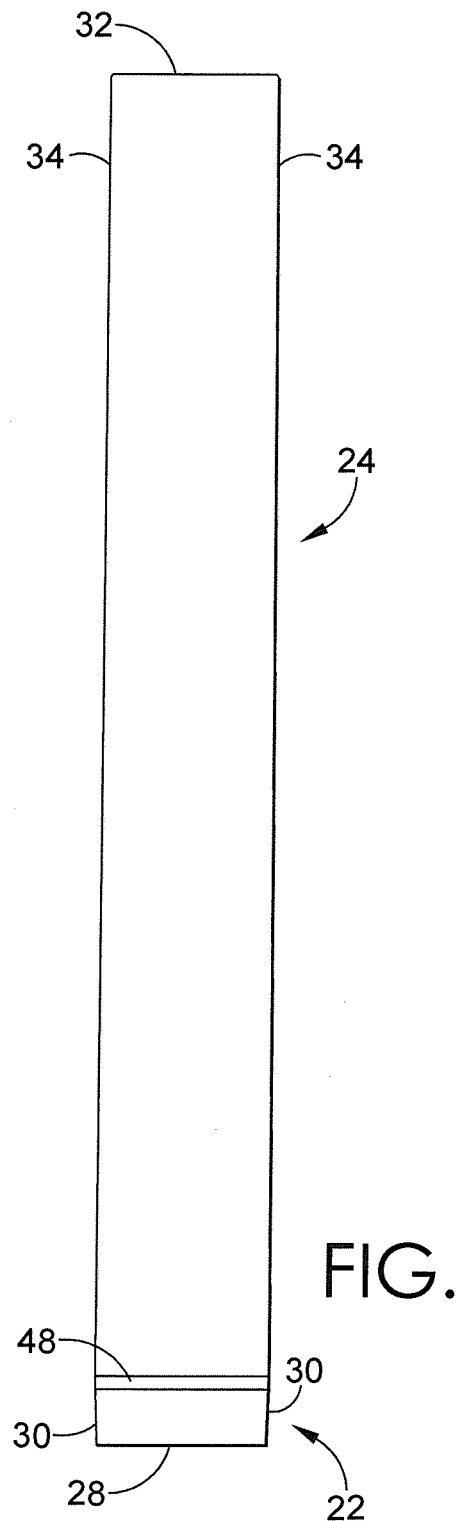
FIG. 2A is a top orthogonal view of the charging case of FIGS. 1A and 1B.
Figure 2B:
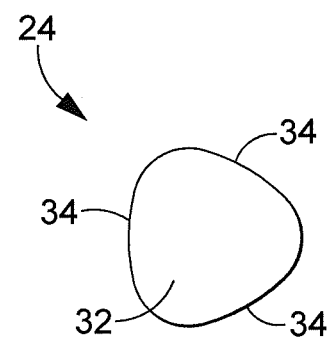
FIG. 2B is a front orthogonal view of the charging case of FIGS. 1A and 1B, particularly illustrating the cap end of the cap assembly.
Figure 2C:
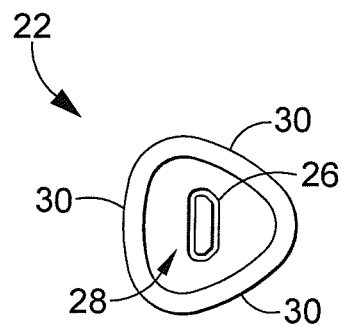
FIG. 2C is a rear orthogonal view of the charging case of FIGS. 1A and 1B, particularly illustrating the base end of the base assembly.

With reference to FIGS. 2A-2C, the base assembly 22 presents a generally flat base end 28 and base sidewalls 30 extending upwardly or perpendicularly from the base end 28 to define the lateral surface of the base assembly 22. As illustrated, the base sidewalls 30 form a substantially triangular shape, though other configurations are considered within the scope of the present invention (i.e., circular, oblong, squared, octagonal, etc.). The cap assembly 24 similarly presents a generally flat cap end 32 and cap sidewalls 34 extending downwardly or perpendicularly from the cap end 32 to define the lateral surface of the cap assembly 24. Similarly, the cap sidewalls 34 form a substantially triangular shape to accommodate the base sidewalls 30, though other configurations are considered for accommodating any such base sidewall 30 configuration.

Turning now to FIG. 3, the case 20 is now in an open state, with the cap assembly 24 removed from the base assembly 22, such that the base assembly 22 is no longer in a supporting relationship with the cap assembly 24. In some embodiments, the base assembly 22 presents a circumferentially extending support face 36 presenting a circumference slightly smaller than a circumferentially extending engagement face 38 of the cap assembly 24. The base assembly support face 36 and cap assembly engagement face 38 are configured for sliding engagement between both faces. The base assembly support face 36 may include one or more notches 40 operable to provide additional securement of the cap assembly 24 to the base assembly 22 when in the supporting relationship. As can also be appreciated, the cap assembly engagement face 38 may similarly include channels (not shown) with which the one or more notches may engage for securement. The base assembly 22 also presents a receptacle 42 (also referred to herein as a "well") for magnetically receiving a charging block portion of the stylus, as will be further described herein.

With reference to FIG. 4, FIG. 4 illustrates a perspective of an exemplary base assembly in accordance with embodiments of the present invention. The base assembly 22 includes a bottom shell 44, an overmold 46, an LED diffuser 48, circuitry 50, charging contacts 52, and an inner shell 56. The bottom shell 44 can house the circuitry 50 and one or more magnets (not shown) as will be further described herein. The bottom shell 44 may be comprised of an ABS-PC polymer blend or other suitable material. The circuitry 50 can include and/or be in electrical communication with a logic board (not shown), wiring (not shown), one or more single or multi-colored light emitting diodes ("LED" lights) (not shown), and/or a communications bus 58 (e.g., micro universal serial bus "USB" port) to perform any number of functionalities. The overmold 46 is generally configured to cover a portion of the bottom shell 44 while providing additional grip to remove the base assembly 22 from the supporting relationship. The overmold 46 may be formed from a rubber material, such as thermoplastic polyurethane, or any other suitable material. The LED diffuser 48 is generally toroidal in shape and may be comprised of a translucent ABS-PC polymer blend (or other suitable material). The LED diffuser 48 can be radially interposed between one or more LED lights and the base assembly sidewall 30 for diffusing light emitted from the one or more LED lights. Such an implementation can provide the illusion that a single light source is emitted, regardless of the number of LED lights being used. Light diffusing technology is generally known in the art and will not be described further herein. The LED lights can be electrically connected to the wiring and circumferentially disposed inside the bottom shell 44, substantially in axial alignment with the LED diffuser 48. In some cases, the LED lights and logic board are configured to indicate when the base assembly 22 is providing an electrical charge to the stylus. Additionally or alternatively, LED lights can indicate a current charge status of the stylus. In some embodiments, a speaker (not shown) can be included to provide audible or haptic feedback for indicating a charge status. The circuitry 50 may additionally or alternatively be in electrical communication with a plurality of charging contacts 52. The charging contacts 52 may be spring-loaded pogo pins, which facilitate communication of the electrical charge signal when depressed. Although three charging contacts 52 are illustrated, any suitable number of charging contacts may be utilized in various implementations of the present invention.

Figure 5A:
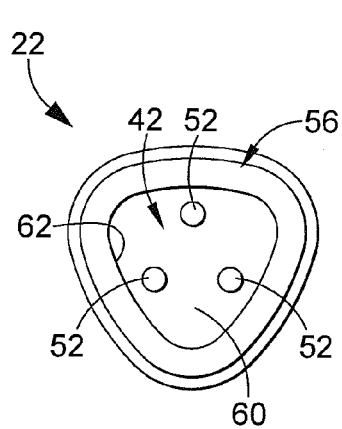
FIG. 5A is a front orthogonal view of the base assembly of FIG. 4, particularly illustrating a receptacle and the charging contacts.
Figure 5B:
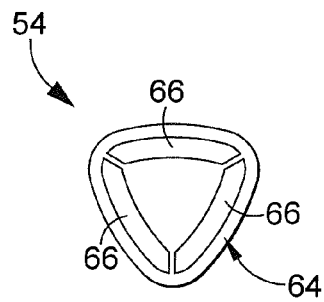
FIG. 5B is a rear orthogonal view of a charging block of an exemplary stylus, particularly illustrating ferromagnetic charging terminals.

With reference now to FIGS. 5A and 5B, the charging contacts 52 generally protrude through or extend into the receptacle 42 of the inner shell 56 of the base assembly for magnetic association with the stylus 54, as illustrated in FIG. 5A. The inner shell 56 includes a receptacle base 60 and a receptacle sidewall 62 (herein also referred to as a "receiving face"), the receptacle sidewall 62 configured in a generally triangular shape, although other shapes may be considered depending on the stylus shape. The receptacle base 60 and sidewall 62 can define a triangular sleeve configured to receive the stylus 54 in any one of three rotary configurations, although any number of shapes may be used in various implementations. As can be seen in FIG. 5B, the stylus 54 can include a charging block 64 presenting a plurality of charging terminals 66, with the charging block 64 configured in a generally triangular shape, with each charging terminal 66 being adjacent to a respective sidewall of the charging block 64. The charging terminals 66 may be comprised of a conductive ferromagnetic material (e.g., nickel, steel, iron, and other conductive ferromagnetic alloys), such that the charging block 64 of the stylus 54 can be magnetically attached to the charging receptacle 42 by virtue of magnetic forces induced by the one or more magnets housed within the bottom shell 44.

FIGS. 5A and 5B illustrate one exemplary embodiment of the present invention, but various implementations can be used without departing from the scope of the present invention. For example, in some implementations, the charging block of the stylus may house magnets while the charging receptacle of the base assembly comprises a ferromagnetic material. In other implementations, magnets may be omitted altogether. In yet other implementations, the charging terminals and/or charging contacts can be of any number, shape, and/or size. For example, in an embodiment in which the stylus is a rectangular shape, four charging terminals may be used, each being adjacent to a respective sidewall of the charging block. As another example, a single ring-shaped charging terminal may be used in connection with a cylindrical-shaped stylus.

Figure 6:
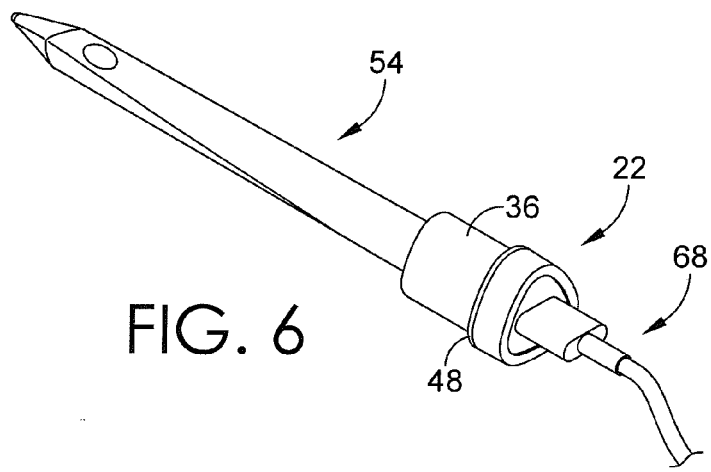
FIG. 6 is a rear perspective view of the base assembly of FIG. 4, particularly illustrating the base assembly in a charging relationship with an exemplary stylus and being supplied with an electrical charge from a power source.

Referring now to FIG. 6, the stylus 54 is shown being in a charging relationship with the base assembly 22. A power supply 68 (e.g., AC adapters, DC adapters, USB cables, etc.) is engaged to the communications bus 58, providing electrical charge signals thereto and throughout the base assembly circuitry 50 as needed. In some implementations, the base assembly logic board can dynamically detect the polarity configuration of the stylus charging terminals 66 currently in contact with the base assembly charging contacts 52. Such implementations can facilitate charging of the stylus irrespective of the polarity alignment between the stylus charging terminals and the charging base charging contacts. As described above, the base assembly receptacle 42 and the stylus charging block 64 can be configured having corresponding shapes, so as to facilitate an appropriate charging configuration between the stylus 54 and charging base assembly 22. In some embodiments, the stylus 54, while in the charging relationship with the base assembly 22, may continue to be operational because electrical signals provided through the base assembly 22 are continuously communicated through the charging block 64 for charging, while exposing a substantial portion of the stylus 54 for contemporaneous operational use thereof. In additional or alternative embodiments, the charging block 64 can be configured to provide a charge to the stylus 54 even when a power supply, such as power supply 68, is not engaged to the communications bus 58. In this regard, the charging block 64 may be configured to stabilize a current or be capacitive in nature such that the charging block 64 can provide charge to a stylus 54 in contact with the charging block 64 without being connected to an external power supply.

Figure 7:
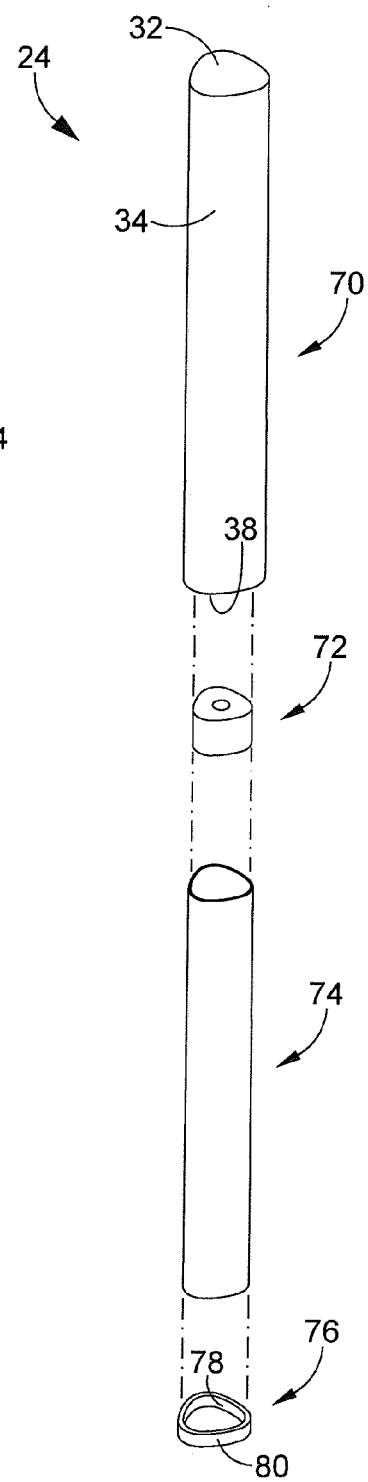
FIG. 7 is a side perspective view of the cap assembly of FIG. 3, particularly illustrating a cap cover, protective foam insert, protective sleeve, and sleeve cap.

With regards to full coverage and protection of the stylus, either while in the charging relationship with the base assembly 22, or simply for carrying while the power supply 68 is in a disengaged state, the cap assembly 24, as illustrated in FIG. 7, can be removably attached to the base assembly 22. As described above, the cap assembly 24 presents a circumferentially extending engagement face 38 for engaging the base assembly 22 support face 36. The cap assembly 24 may be comprised of a cap cover 70 having a protective foam insert 72, an inner protective sleeve 74, and a sleeve cap 76 all disposed therein. The cap cover 70 is generally defined by the cap end 32 and cap side walls 34 defining an enclosure. The cap end 32 defines the closed end of the cap cover, with the opposite axial end defining an open end. The protective foam insert 72 can be secured to the closed end, internal to the enclosure, and provides additional securement of the stylus 54 when the cap assembly 24 is slidably engaged to the base assembly 22. The inner protective sleeve 74 might be tubular and axially interposed between the protective foam insert 72 and the sleeve cap 76. The sleeve 74 lines a substantial portion of the enclosure for providing additional scratch protection to the stylus 54. The protective sleeve 74 may be comprised of a synthetic leather, although any material may be considered. The protective sleeve 74 may be held in place by a toroidal sleeve cap 76, which might be securely disposed inside the cap cover 70 near the open end. The sleeve cap 76 is generally configured having an inner circumference 78 and an outer circumference 80. The sleeve cap outer circumference 80 is substantially similar to the circumference of the engagement face 38, such that the sleeve cap 76 is secured within the cap cover 70 with an adhesive or with a tension fit and thereby securing the protective sleeve 74. The sleeve cap inner circumference 78 can be tapered, such that the stylus 54 can pass the sleeve cap 76 with relative ease while engaging the cap assembly 24 to the base assembly 22.

Figure 8A:
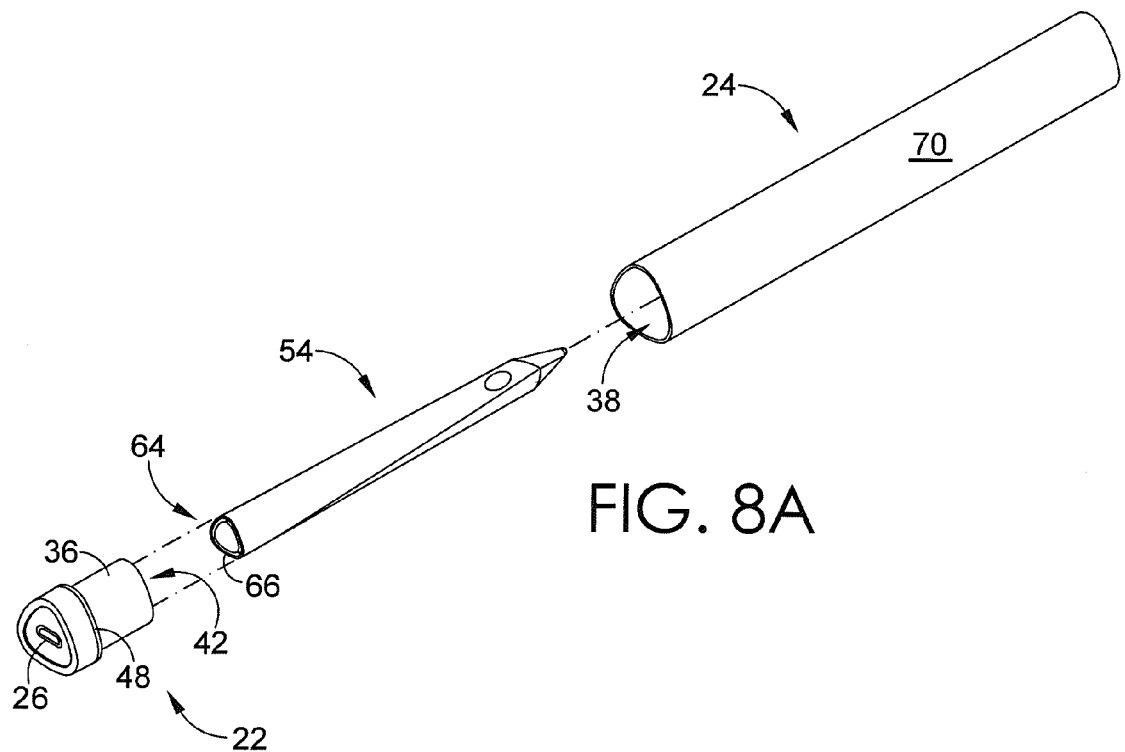
FIG. 8A is a rear perspective view of the charging case of FIGS. 1A and 1B, particularly illustrating the engaging configuration between the base assembly, an exemplary stylus, and the cap assembly.
Figure 8B:
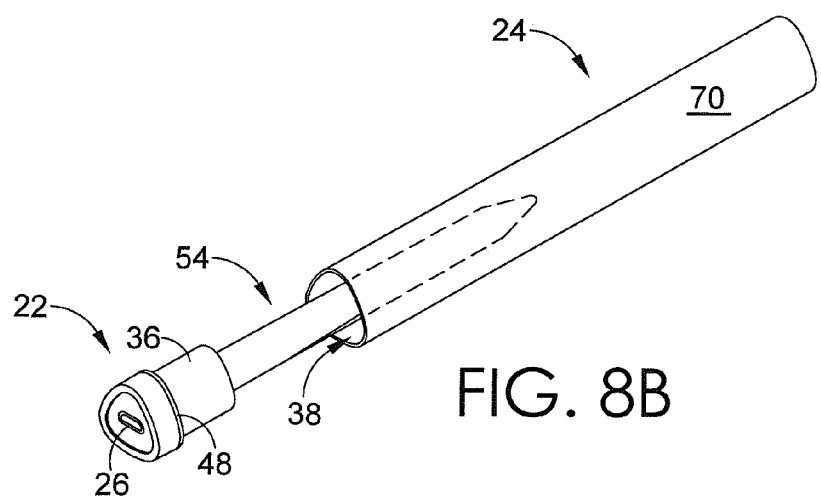
FIG. 8B is a rear perspective view of the charging case of FIGS. 1A and 1B, particularly illustrating the first order of assembly for creating the engaged configuration between the base assembly, an exemplary stylus, and the cap assembly.

Moving now to FIGS. 8A and 8B, an exemplary stylus 54 is shown for illustrating the engagement and enclosure thereof using the described charging case. As described above, the exemplary stylus 54 includes a charging block 64, which may have ferromagnetic charging terminals 66. The charging block 64 is configured to removably attach to the base assembly 22 within the base assembly receptacle 42. The receptacle 42 can present a magnetic force supplied by one or more magnets disposed in the bottom shell 44. Generally, the stylus charging block 64 can be initially attached to the base assembly receptacle 42, followed by an engagement of the cap assembly 24 to the base assembly 22, as seen in FIG. 8B.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

It will be understood that certain features and subcombinations are of utility and may be employed without reference to other features and subcombinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible aspects may be made of the disclosure without departing from the scope thereof, it is to be understood that all matter herein set forth or shown in the accompanying drawings is to be interpreted as illustrative and not in a limiting sense.

What is claimed is:

1. A charging case for a rechargeable stylus comprising:
 a charger body portion having a first and second end and including,
  a receptacle disposed at the first end and presenting a receiving face adapted to interface with a charging block of a stylus for magnetic association therewith, the stylus charging block being disposed at a first end of the stylus and presenting a plurality of ferromagnetic charging terminals;
  a magnetic element fixed adjacent the receptacle opposite the receiving face and configured to magnetically secure the charger body portion relative to the charging block of the stylus;

circuitry coupled to a communications bus and operable to carry electrical signals therefrom;

a plurality of charging contacts in electrical communication with the circuitry and configured to associate with the plurality of ferromagnetic charging terminals, with each charging contact extending into the receptacle and operably contacting a respective charging terminal upon association of the charger body portion with the charging block of the stylus;

a plurality of LEDs being electrically connected to the circuitry and circumferentially disposed inside the charger body portion, the plurality of LEDs operable to simultaneously emit light for indicating a charge status of the stylus; and a light diffusing ring radially interposed between the plurality of LEDs and exterior of the charger body portion, the light diffusing ring adapted to provide an illusion of a single light source when light is emitted from the plurality of LEDs.

2. The case of claim 1, wherein the circuitry includes a power source polarity detection element and a charge polarity switching element, the power source polarity detection element configured to sense the polarity of the stylus charging terminals upon association of the charger body portion with the stylus charging block, the charge polarity switching element configured to automatically adjust the polarity of the electrical signals supplied through the communications bus upon association of the charger body portion with the stylus charging block.

3. The case of claim 2,
wherein the stylus charging block presents a generally triangular sidewall, and
wherein the receptacle includes a base and a generally triangular sidewall extending upwardly from the base to define a sleeve configured to receive the stylus in any one of three rotary configurations.

4. The case of claim 1, further comprising:
a cap portion for providing a protective casing around a portion of the stylus, the cap portion being releasably connected to the charger body portion so as to be removably secured in supporting relationship with the charger body portion.

5. The case of claim 4,
wherein the charger body portion presents a circumferentially extending support face, and
wherein the cap portion presents a circumferentially extending engagement face which engages the support face when the cap portion is in the supporting relationship.

6. The case of claim 1, wherein when the charger body portion is in association with the charging block of the stylus and an electrical charge is being communicated therethrough, the charger body portion is operable to supply power to the stylus for contemporaneous use thereof.

7. The case of claim 1, wherein each of the plurality of charging contacts is comprised of spring loaded pogo pins configured to dampen collision between the charger body portion and the charging block of the stylus resulting from the magnetic securement.

8. The case of claim 1, wherein the communications bus is substantially disposed in the charger body portion.

9. The case of claim 8, wherein the communications bus is a Universal Serial Bus (USB)-type port.

10. A charging case for a rechargeable stylus comprising:
a base assembly including,
a well for magnetically receiving a charging block disposed at a first end of a stylus, the charging block presenting a plurality of charging terminals coupled to a rechargeable power source, a plurality of charging contacts configured to associate with the plurality of charging terminals, with each charging contact operably contacting a respective charging terminal upon association of the base assembly with the charging block of the stylus, a logic board operable to dynamically change a polarity configuration of each charging contact to match a polarity of the respective charging terminal upon sensing the polarity thereof, a charging interface electrically coupled to the charging contacts via the logic board, the charging interface configured for removable engagement of a power source adapter;

a plurality of LEDs electrically coupled to the logic board and circumferentially disposed inside the base assembly, the plurality of LEDs operable to simultaneously emit light for indicating a charge status of the stylus, and a light diffusing ring radially interposed between the plurality of LEDs and exterior of the base assembly, the light diffusing ring adapted to provide an illusion of a single light source when light is emitted from the plurality of LEDs; and a cap assembly including an enclosure adapted to slidably engage a portion of the base assembly for removable coverage of the stylus.

11. The case of claim 10, wherein the cap assembly further includes a cap base and cap sidewalls extending upwardly from the base to define the enclosure, a closed end defined by a first end adjacent the cap base and an open end defined by a second end opposite the first end.

12. The case of claim 11, wherein the cap assembly further includes a protective foam insert secured to the closed end, internal to the enclosure, for providing additional securement of the stylus when the cap assembly is slidably engaged to the base assembly.

13. The case of claim 12, wherein the cap assembly further includes an inner protective sleeve, the sleeve lining a substantial portion of the enclosure for providing additional scratch protection to the stylus.

14. The case of claim 13, wherein the cap assembly further includes a sleeve cap, the sleeve cap secured near the open end, internal the enclosure, and adapted to hold the inner protective sleeve inside the enclosure.

15. A system comprising:
an electronic stylus including,
a rechargeable power source;
a charging block disposed on a first end of the stylus, the charging block presenting a plurality of charging terminals coupled to the rechargeable power source;
a base assembly including,
a receptacle for magnetically receiving the stylus charging block;
a plurality of charging contacts configured to associate with the plurality of charging terminals, with each charging contact operably contacting a respective charging terminal upon association of the base assembly with the stylus charging block;
a charging interface electrically coupled to the charging contacts, the charging interface configured for removable engagement of a power source adapter, the power source adapter operable to send electrical charge to the power source for recharging;

a plurality of LEDs circumferentially disposed inside the base assembly, the plurality of LEDs operable to simultaneously emit light for indicating a charge status of the stylus, and a light diffusing ring radially interposed between the plurality of LEDs and exterior of the base assembly, the light diffusing ring adapted to provide an illusion of a single light source when light is emitted from the plurality of LEDs; and a cap assembly including,
   an enclosure adapted to slidably engage a portion of the base assembly for removably encasing the stylus.

16. The system of claim 15,
wherein the charging terminals of the stylus charging block are comprised of a ferromagnetic material, and
wherein the base assembly further includes a magnetic element operable to magnetically secure the base assembly relative to the charging block of the stylus.

17. The system of claim 15,
wherein the stylus charging block and base assembly receptacle each present substantially similar regular-polygonal-shaped sidewalls for rotatable magnetic securement configurations therebetween.

18. The system of claim 17,
wherein each of the plurality of charging terminals is each disposed along a respective stylus charging block sidewall.

19. The system of claim 17,
wherein the stylus charging block and base assembly receptacle present substantially similar triangle-shaped sidewalls for magnetic securement therebetween in any one of three rotary configurations.

\* \* \* \* \*